United States Patent [19]

Battreall

[11] Patent Number: 5,234,523
[45] Date of Patent: Aug. 10, 1993

[54] METHOD OF LAMINATING A FABRIC COVERED ARTICLE

[75] Inventor: Marc A. Battreall, Plainwell, Mich.

[73] Assignee: United Technologies Automotive, Inc., Dearborn, Mich.

[21] Appl. No.: 874,276

[22] Filed: Apr. 24, 1992

[51] Int. Cl.⁵ .............................................. B32B 31/00
[52] U.S. Cl. .................................... 156/283; 156/278; 156/281; 156/285; 156/305; 156/308.8; 264/85; 428/246
[58] Field of Search ............... 156/308.8, 281, 278, 156/305, 283, 285; 428/246; 264/85

[56] References Cited

U.S. PATENT DOCUMENTS

| | | |
|---|---|---|
| 3,265,530 | 8/1966 | Marzocchi et al. |
| 3,280,237 | 10/1966 | Corbin et al. |
| 3,300,357 | 1/1967 | Doerfling |
| 3,654,019 | 4/1972 | Cusick |
| 3,867,240 | 2/1975 | Doerfling |
| 3,891,738 | 6/1975 | Shen |
| 3,911,186 | 10/1975 | Trotman |
| 3,935,358 | 1/1976 | Wyeth et al. |
| 3,953,631 | 4/1976 | Gordon |
| 3,982,977 | 9/1976 | Gordon |
| 4,008,301 | 2/1977 | Arisaka et al. |
| 4,009,310 | 2/1977 | Scobbo |
| 4,012,544 | 3/1977 | Richards |
| 4,052,041 | 10/1977 | Walter |
| 4,069,286 | 1/1978 | Greenhalgh ............ 264/85 |
| 4,077,821 | 3/1978 | Doerfling |
| 4,097,629 | 6/1978 | Schneider |
| 4,355,081 | 10/1982 | Kinsley, Jr. |
| 4,469,655 | 9/1984 | Kiss |
| 4,517,147 | 5/1985 | Taylor et al. |
| 4,692,199 | 9/1987 | Kozlowski et al. |
| 4,744,160 | 5/1988 | Elliott et al. |
| 4,786,351 | 11/1988 | Elliott et al. |
| 4,795,517 | 1/1989 | Elliott et al. |
| 4,895,508 | 1/1990 | Held |
| 4,923,555 | 5/1990 | Elliott et al. |
| 4,923,656 | 5/1990 | Held |
| 5,108,691 | 4/1992 | Elliott |

FOREIGN PATENT DOCUMENTS

| | | |
|---|---|---|
| 0370991 | 5/1990 | European Pat. Off. |
| 2058820 | 5/1972 | Fed. Rep. of Germany |
| WO8704118 | 7/1987 | World Int. Prop. O. |
| WO8707557 | 12/1987 | World Int. Prop. O. |
| WO8801565 | 3/1988 | World Int. Prop. O. |
| WO8801935 | 3/1988 | World Int. Prop. O. |

Primary Examiner—John J. Gallagher
Attorney, Agent, or Firm—Alan C. Cohen

[57] ABSTRACT

The present invention discloses a method for laminating a gas permeable layer onto a preformed substrate by forming a laminate precursor comprising a substrate and a gas permeable layer in which a layer of adhesive is positioned between the gas permeable layer and the substrate surface. A layer of water is formed on the surface of the gas permeable layer and the wetted surface is contacted by a preheated platen and super heated steam is ejected onto the gas permeable layer causing the adhesive to cure and bond the gas permeable layer to the substrate.

8 Claims, 1 Drawing Sheet

METHOD OF LAMINATING A FABRIC COVERED ARTICLE

DESCRIPTION

1. Technical Field

The technical field to which this invention pertains are processes for laminating a layer of material to a substrate; specifically those laminating processes using heat and pressure to form the lamination.

2. Background of the Invention

Contoured products have been made by placing one or more layers of material into a matched mold press and under heat and pressure forming the materials into the desired shape. In certain instances it is desirable to form the contoured substrate first and then laminate an attractive decorative cover layer onto the prepared substrate. Typically, this is done by placing the prepared substrate into a matched mold, placing an adhesive onto the surface of the substrate to be bonded with the decorative covering, placing the decorative covering onto the adhesive containing surface. Then closing the mold and through the application of heat and pressure causing the adhesive to cure, thus bonding the decorative layer to the substrate. In many instances during this process not only is the decorative layer bonded to the substrate but the structure of the substrate is simultaneously modified as well.

The molds in these processes are generally preheated to a certain temperature which will be sufficient, not only to cause the adhesive to cure, but to cause the adhesive to cure quickly; for in order to reduce the cost of production it is desirable to keep the cycle time as short as possible. However, in trying to attain shorter cycle times, the temperatures used in these processes have increased. This is fine for those products which use materials unaffected by such high temperatures, however, in the event one wishes to laminate a layer of material or to use a substrate, either of which would be adversely affected by exposing these materials to such high temperatures, the current processes are either not practical or not as cost effective as they could be. Specifically, in the instance of manufacturing automobile interior trim parts it is desirable to use a low cost decorative covering over the substrate material. However, due to its low melt temperature such low cost materials are not compatible with the faster processes which incorporate higher laminating temperatures.

Therefore, what is needed in this art is a method for forming a fabric coated substrate which will be useful in forming laminates having low temperature fabric coverings and which is fast, efficient and cost effective.

SUMMARY OF THE INVENTION

The present invention discloses a method for fabricating a laminated structure comprising a substrate having at least one gas permeable layer adhesively bonded thereto. The method comprises, forming a laminate precursor comprising a substrate and at least one layer of a gas permeable material positioned over at least a portion of the surface of the substrate wherein there is a layer of adhesive positioned between the substrate and the gas permeable layer; causing a layer of water to form on the surface of the gas permeable layer; contacting the surface of the gas permeable layer with a preheated platen and applying pressure and super heated steam onto the gas permeable layer, causing the adhesive to bond the gas permeable layer to the substrate.

BEST MODE FOR CARRYING OUT THE INVENTION

Figure 1:
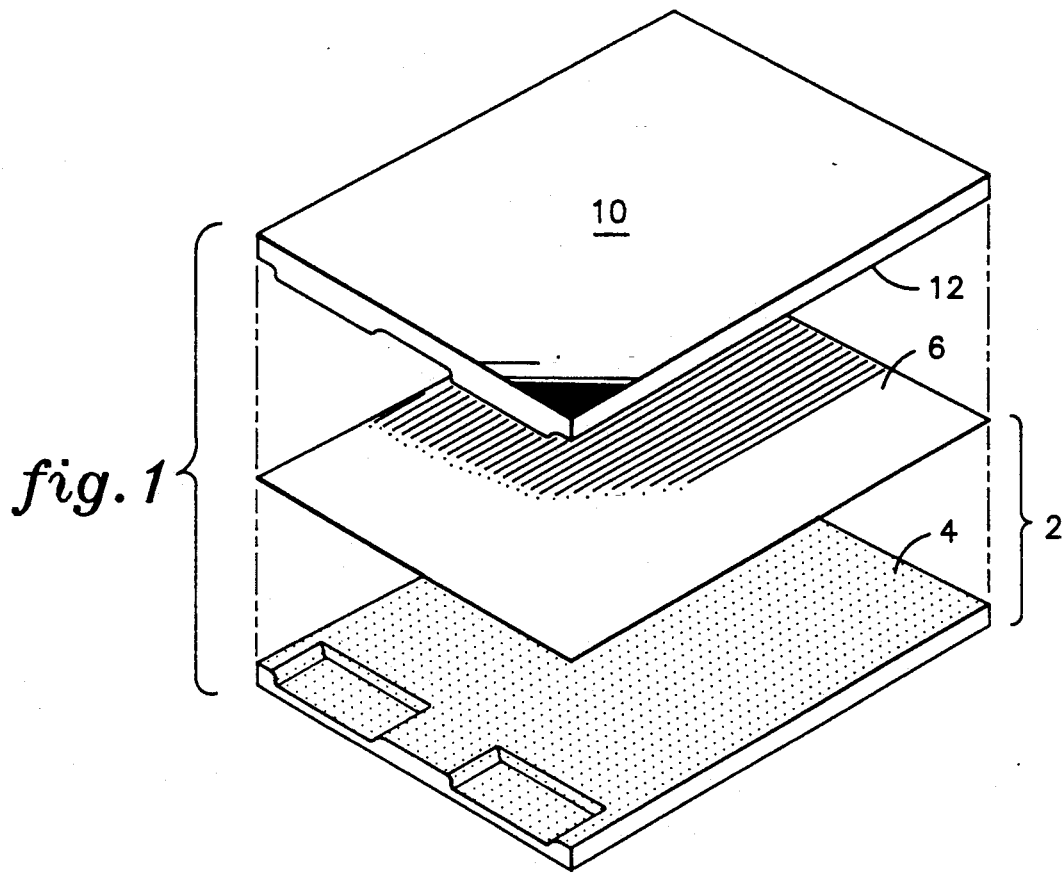
FIG. 1 is an exploded view of the constituents useful in the present process.
Figure 2:
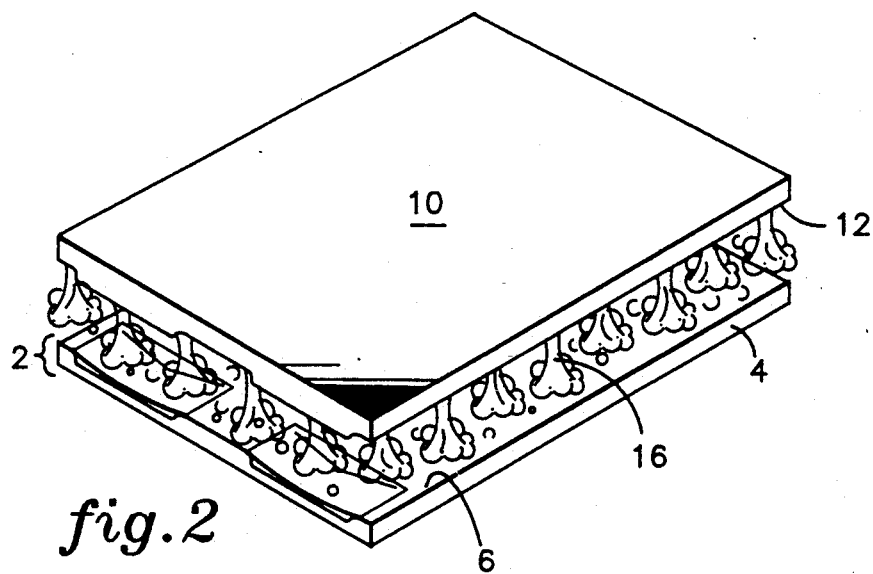
FIG. 2 is a view of the process at that stage where the super heated steam is being ejected from the die causing the layer of water to condense on the surface of the gas permeable layer.

The substrate used in the present invention may be any known substrate which can be exposed to the processing steps without being adversely affected. Typically, these substrates will be in the form of preformed substrates, in other words, substrates that have already been processed by conventional means to have the desired shape of the final laminate and will be substantially unaffected by further processing. In the case of automotive interior trim products such as shelf liners, the substrate may be the conventional fiber reinforced phenolic resin bonded material which has been formed under heat and pressure. However, other materials such as wood fibers, shoddy, foam, cotton or plastic may be used as well. Naturally, the materials used in the manufacture of the substrate must not only be compatible with the processing steps (temperature) but also compatible with the adhesive as well.

Once the substrate has been made an adhesive layer is positioned over that portion of the substrate surface which is to be bonded to the gas permeable layer. The adhesive may be in the form of a liquid, a powder, a film or web and may be applied to the substrate surface in any of the conventional methods for doing so. The adhesive should be one which will cause the gas permeable layer to bond to the substrate upon the application of heat at the desired operating temperatures. Many such adhesives are already in use in bonding similar materials in prior art processes and would be readily known to those skilled in this art. Some preferred heat activated adhesives are thermoplastic, polymeric, or phenolic based adhesives. These may be polyamides, polyolefins, polyesters, polyurethane, etc., and it is preferred that they be in the form of a web. The preferred materials are polyamides available from Applied Extrusion Technologies, Inc , Middletown, Del. and sold as SHARNET TM adhesive webs. The amounts of adhesive to be applied will be conventional, but will likely vary depending on the physical characteristics of the materials to be bonded.

The gas permeable layer is typically a decorative layer and is generally formed of a knitted or woven material. In the automotive industry this material is preferably made of polypropylene. Other types of material such as nylon, rayon, polyethylene, polyurethane etc., may be used so long as it is capable of maintaining its physical appearance and strength during the course of the lamination process. The term gas permeable for purposes of this invention means sufficiently porous to permit the super heated steam to pass through the gas permeable layer and cause the adhesive to bond the layers together.

The presses and platens are conventional and are described in numerous patents for applications other than those described here and would certainly be known to those skilled in the art. Typically the platens 10 will be formed of a metal such as aluminum with a means to heat the surface of the platen which will be in contact with the surface of the gas permeable layer. Typically this may be achieved through the use of electrical strip heaters, steam, hot oil etc. The platens, both upper and lower may be flat or they may be cast in the shape of the substrate's final form. Such molded platens are sometimes referred to as match molds. The upper platen should have holes in its surface to permit the ejection of super heated steam onto the surface of the gas permeable layer. The size and distribution of the holes will be known to those skilled in this art and will be one of design choice depending particularly on the materials to be bonded the pressure and temperature of the steam an design of the substrate. Further, the press should be equipped with a means for supplying super heated steam to at least the upper platen at pressures sufficient to cause the steam to be ejected onto the surface of the gas permeable layer.

Referring now to the Figures, which are intended to be and not limiting. The process is carried out by first forming the laminate precursor 2 comprising the substrate 4 having a gas permeable layer 6 positioned over that portion of its surface which is to be covered and having an adhesive positioned between the substrate 4 and the gas permeable layer 6. The formation of this laminate precursor may be performed using any conventional technique and any reasonable sequence. The precursor 2 can be assembled prior to it being positioned within the press (not shown) or it may be assembled in the press itself one component at a time. Once the precursor 2 has been assembled and positioned in the press, a layer of water is formed on the surface of the gas permeable layer. This may be done in any conventional manner such as by spraying a very fine mist of water over the surface of the membrane just prior to the heated platen coming in contact with the surface of the gas permeable layer.

The step of forming a layer of water on the surface of the gas permeable layer prior to actually exposing the layer to the heated platen and super heated steam permits the use of materials in this process which otherwise would not be able to withstand the rigors of the process. It is not fully understood how the moisture works to prevent damage to the gas permeable layer, however, it is believed that such a layer insulates the gas permeable layer sufficiently against the hot platen and super heated steam for those few seconds it takes to activate the adhesive and bond the layers together. No matter how it works, such an operation permits the use of higher platen temperatures resulting in faster cycle times without damaging the gas permeable layers.

In the preferred mode, the platen 10 is positioned in close proximity (but not in contact with) the surface of the gas permeable layer 6. Super heated steam 16 is then ejected through the holes (not shown) in the surface of the platen 10 directing the super heated steam toward the gas permeable layer surface 6. The amount of steam ejected will vary but it should be sufficient to cause water to form on the gas permeable surface. After the water layer has been formed the platen 10 is brought into contact with the gas permeable layer (generally, super heated steam will continuously be ejected from the time the water layer is formed through curing of the adhesive) and super heated steam is ejected through the holes 12 onto the surface of the gas permeable layer 6 while pressure is applied to hold the gas permeable layer 6 in contact with the substrate 4 until the adhesive 8 has cured thereby bonding the two layers together. The amount of super heated steam to be ejected during this step and its temperature will again be subject to some experimentation and will depend on the type of material the gas permeable layer is made of and the length of time it takes to cause the adhesive to bond the layer together. Generally, this time will be from about 2 sec to about 20 seconds.

The distance between the platen surface 12 and the surface of the gas permeable layer 6 during the water condensing phase will depend on a number of factors including but not limited to the temperature and pressure of the super heated steam, the temperature and humidity of the ambient air, the temperature of the platen surface and the temperature of the surface of the gas permeable layer all of which contribute to the amount and length of time required to form the water layer onto the gas permeable layer. The particular distance required and other parameters for a specific application could however, be determined through undue experimentation. It has been determined that the preferred distance between the die surface and the gas permeable layer should be between about 2 inches and about 8 inches when the temperature of the super heated steam is in the range of about 400° F. to about 700° F. at a pressure ranging from about 70 psia to about 120 psia.

It should also be noted that the platen 10 should apply sufficient pressure to cause the gas permeable layer 6 to conform to the shape of the substrate 4 surface and assist in the bonding of the gas permeable layer 6 to the substrate 4. The pressure will vary depending on the materials being processed but will generally be in the range of about 50 psia to about 200 psia.

After the super heated steam has been ejected into the gas permeable layer and the layers bonded together, the platen 10 is raised and the laminated product is removed.

It has been found that when laminating substrates of complicated design (i.e. having high density and low density areas) it is sometimes difficult to achieve sufficient uniform pressure along the entire surface of the substrate to create a uniform bond strength between the gas permeable layer and the substrate. This problem may be solved by forming holes in the surface of the bottom platen adjacent to the underside of the substrate and injecting a pressurized gas, such as shop air, through the holes onto the underside of the substrate. This causes the substrate to be raised up against the upper platen surface and improves the uniformity of pressure on the top surface of the substrate thereby resulting in more uniform bonding. The pressure needed to achieve this uniformity will of course depend on the size and weight and complexity of the design of the substrate. However, such pressures will be readily determinable without undo experimentation. It has been found that pressures in the range of about 40 psia to about 120 psia are adequate.

The present invention creates a process which presents a rapid lamination of low melt temperature gas permeable layers. Such a process will not only permit cost effective production of existing laminate combinations but will encourage the use of new materials not thought useful in previous laminating processes.

I claim:

1. A method for adhesively laminating a gas permeable layer to a preformed substrate comprising;

forming a laminate precursor comprising a substrate, a gas permeable layer having a first surface and a second surface, said gas permeable layer being positioned over a portion of the substrate surface and a layer of adhesive placed between the first surface of the gas permeable layer and the substrate surface;

wetting the second surface of the gas permeable layer;

contacting a heated platen with the wetted surface of the gas permeable layer and applying pressure to the gas permeable layer while ejecting super heated steam onto the gas permeable layer causing the adhesive to bond the gas permeable layer to the substrate surface.

2. The process of claim 1 wherein the gas permeable layer is a decorative fabric.

3. The process of claim 1 wherein the gas permeable layer is selected from the group comprising nylon, rayon, polyurethane, polyethylene or polypropylene.

4. The process of claim 1 wherein the substrate comprises shoddy.

5. The process of claim 1 wherein the temperature of the super heated steam ejected from the die is about 400° F. to about 700° F.

6. The process of claim 1 wherein the adhesive is powdered hot melt adhesive.

7. A method for adhesively laminating a gas permeable layer to a preformed substrate comprising;

forming a laminate precursor comprising a substrate, at least one gas permeable layer having a first surface and a second surface wherein said first surface is positioned over at least a portion of the surface of the substrate and a layer of adhesive is positioned between the substrate and the gas permeable layer;

positioning a preheated platen sufficiently close to the second surface of the gas permeable layer such that when super heated steam is ejected from the surface of the platen a layer of water condensate is caused to form on the second surface of the gas permeable layer;

contacting the preheated platen with the wetted surface of the gas permeable layer and applying pressure and super heated steam to the gas permeable layer causing the adhesive to bond the gas permeable layer to the substrate.

8. The method of claim 7 wherein the preheated platen is positioned above the gas permeable layer at a distance of between about 2 inches and 8 inches.

* * * * *